US008971911B2

(12) United States Patent
Barnawi

(10) Patent No.: US 8,971,911 B2
(45) Date of Patent: Mar. 3, 2015

(54) COGNITIVE RADIO SENSING METHOD AND SYSTEM

(71) Applicant: King Abdulaziz University, Jeddah (SA)

(72) Inventor: Ahmed M. Barnawi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 227 days.

(21) Appl. No.: 13/779,665

(22) Filed: Feb. 27, 2013

(65) Prior Publication Data
US 2013/0172030 A1 Jul. 4, 2013

Related U.S. Application Data

(63) Continuation-in-part of application No. 13/562,133, filed on Jul. 30, 2012, now abandoned, and a continuation of application No. 12/662,656, filed on Apr. 27, 2010, now abandoned.

(51) Int. Cl.
| | |
|---|---|
| H04W 16/14 | (2009.01) |
| H04B 15/00 | (2006.01) |
| H04B 1/69 | (2011.01) |
| H04B 17/00 | (2006.01) |
| H04L 27/00 | (2006.01) |
| H04W 24/10 | (2009.01) |
| H04L 27/10 | (2006.01) |

(52) U.S. Cl.
CPC .................. *H04B 15/00* (2013.01); *H04B 1/69* (2013.01); *H04B 17/005* (2013.01); *H04W 24/10* (2013.01); *H04B 2001/6912* (2013.01); *H04L 27/0006* (2013.01); *H04L 27/103* (2013.01); *H04W 16/14* (2013.01)
USPC ............ 455/454; 455/453; 455/448; 455/447

(58) Field of Classification Search
CPC .............................. H04W 16/14; H04W 16/16
USPC .................................. 455/454, 453, 448, 447
See application file for complete search history.

(56) References Cited

U.S. PATENT DOCUMENTS

| | | | | |
|---|---|---|---|---|
| 6,418,158 | B1 * | 7/2002 | Vishwanath et al. | ......... 375/139 |
| 7,110,432 | B2 | 9/2006 | Hooton | |

(Continued)

OTHER PUBLICATIONS

Wideband Sensing for Cognitive Radio Systems in Heterogeneous Next generation Networks, Ahmed M. Barnawi, International Journal of Computer Networks (IJCN), vol. (3) : Issue (2) : May 2011.

*Primary Examiner* — Wen Huang
(74) *Attorney, Agent, or Firm* — Richard C Litman

(57) ABSTRACT

The cognitive radio system and method uses a wideband chirp signal for characterization of the spectra that a mobile radio may use. A cognitive radio base station broadcasts the low power reference wideband chirp signal with bandwidth covering the sensed spectrum. At the receiver, spectral resolution in the presence of white noise is achieved by cross-correlating the chirp signal with a locally generated copy of itself (i.e., matched filtering). A Fast Fourier Transform (FFT) is applied to the output of this matched filtering. The FFT output is fed to a decision circuitry, where a threshold value is set to decide the minimum amplitude of utilized frequencies. This process eases sensing computational complexity and improves the quality of sensing, thereby offering enhanced cognition at the cognitive radio receiver.

12 Claims, 11 Drawing Sheets

(56) References Cited

U.S. PATENT DOCUMENTS

| | | |
|---|---|---|
| 2001/0048691 A1* | 12/2001 | Chang et al. .................. 370/442 |
| 2003/0133496 A1* | 7/2003 | Hooton ........................ 375/139 |
| 2006/0258296 A1* | 11/2006 | Steer et al. ................. 455/67.13 |
| 2007/0053410 A1 | 3/2007 | Mahonen et al. |
| 2007/0120731 A1* | 5/2007 | Kelly et al. .................. 342/159 |
| 2008/0165833 A1* | 7/2008 | Lee ............................... 375/139 |
| 2008/0231496 A1* | 9/2008 | Sakamoto ....................... 342/59 |
| 2008/0305809 A1 | 12/2008 | Sayers |
| 2009/0022208 A1* | 1/2009 | Hall et al. ..................... 375/132 |
| 2009/0074033 A1* | 3/2009 | Kattwinkel ................... 375/132 |
| 2009/0274081 A1 | 11/2009 | Kwon et al. |
| 2010/0202359 A1 | 8/2010 | Nallapureddy |

\* cited by examiner

COGNITIVE RADIO SENSING METHOD AND SYSTEM

CROSS-REFERENCE TO RELATED APPLICATION

This application is a continuation-in-part of my prior U.S. patent application, Ser. No. 13/562,133, filed Jul. 30, 2012, which is a continuation of my prior U.S. patent application Ser. No. 12/662,656, filed Apr. 27, 2010.

BACKGROUND OF THE INVENTION

1. Field of the Invention

The present invention relates to radio systems providing wireless voice and data communications, and more particularly, to a cognitive radio sensing method and system that is capable of changing its operating parameters responsive to a changing and unanticipated radio environment, and performs such cognitive functions using a wideband chirp signal to reduce computational complexity.

2. Description of the Related Art

Most traditional radios have their technical characteristics set at the time of manufacture. More recently, radios have been built that self-adapt to one of several preprogrammed radio frequency (RF) environments that might be encountered. The main idea of cognitive radio is to improve the utilization of the scarce radio resources. A cognitive radio can sense its environment and alter radio resources such as time and frequency and operational behavior to benefit both itself and its geographical and spectral neighbors. The ability to sense and respond intelligently to changes in radio environment distinguishes cognitive radios from fixed radios. A cognitive radio can respond intelligently in order to utilize scarce and unused radio resources. The result is enhanced communications at the least costly radio resources. The Oxford English Dictionary (OED) defines "cognitive" as: "pertaining to cognition, or to the action or process of knowing". "Cognition" is defined as "the action or faculty of knowing taken in its widest sense, including sensation, perception, conception, etc., as distinguished from feeling and volition". Given these definitions, the process of sensing an existing wireless channel, evolving a radio's operation to accommodate the perceived wireless channel, and evaluating what happens is appropriately termed a cognitive process. Most cognitive computing systems to date have been based on sensing methodologies, which result in high computational complexity.

The success of cognitive transmission strategies relies on the quality and quantity of the cognition systems at the receiver. Such cognition is acquired through rigorous sensing of the radio channel and an ability to characterize the interference. Based on the sensing functionality, the transmission facilities should adapt their transmissions accordingly.

The problem of spectrum sensing and characterization is a typical trade-off problem where accuracy and the simplicity are inversely related. The most widely known sensing techniques are match filtering, energy detection, and cyclostationary features detection. While match filtering is the optimal detection technique, a practical implementation is difficult due to system requirements. At a lower level of difficulty, the performance of cyclostationary features detection is near optimal. However, system complexity is non-trivial. Energy detection is the least complex and most inaccurate among the three methods.

Mobile Next Generation Networks (MNGN) are characterized as heterogeneous networks where varieties of access technologies are meant to coexist. Decisions on choosing an air interface that meets a particular need at a particular time should be shifted from the network's side to a (more intelligent) user's side. Moreover, network operators and regulators have come to the realization that assigned spectrum bands are not utilized as they should be. Cognitive radio stands out as a candidate technology to address many emerging issues in MNGN, such as capacity, quality of service and spectral efficiency. As a transmission strategy, cognitive radio systems depend greatly on sensing the radio environment. This strategy requires a novel approach towards interference characterization in cognitive radio networks.

Thus, a cognitive radio sensing method solving the aforementioned problems is desired.

SUMMARY OF THE INVENTION

In the cognitive radio sensing method, a cognitive radio base station broadcasts a low power reference wideband chirp signal with bandwidth covering a wide portion of the sensed spectrum. Cross-correlation characteristics of the chirp signal in time and frequency domains are exploited to enhance the sensing capabilities of the receiver. At the receiver, spectral resolution in the presence of channel interference is achieved by cross-correlating the chirp signal with a locally generated copy of itself (i.e., matched filtering). A Fast Fourier Transform (FFT) is applied to the output of this matched filtering. The FFT output is fed to a decision circuit, where a threshold value is set to decide the minimum amplitude of the utilized frequencies. This process improves the quality of sensing by offering enhanced cognition at the cognitive radio terminals at low computational complexity cost.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
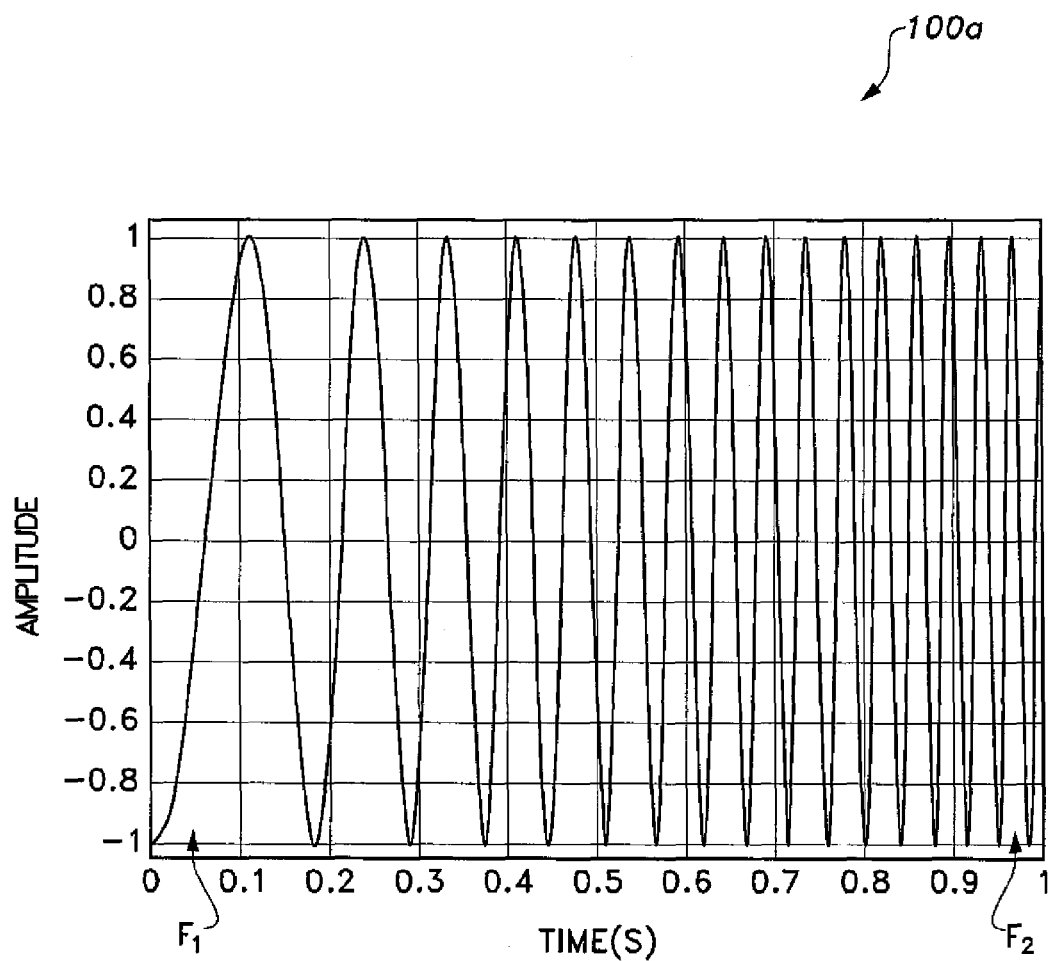
FIG. 1A is a plot showing the time domain spectrum of an exemplary cognitive radio sensing chirp signal used in a cognitive radio sensing system according to the present invention.
Figure 1B:
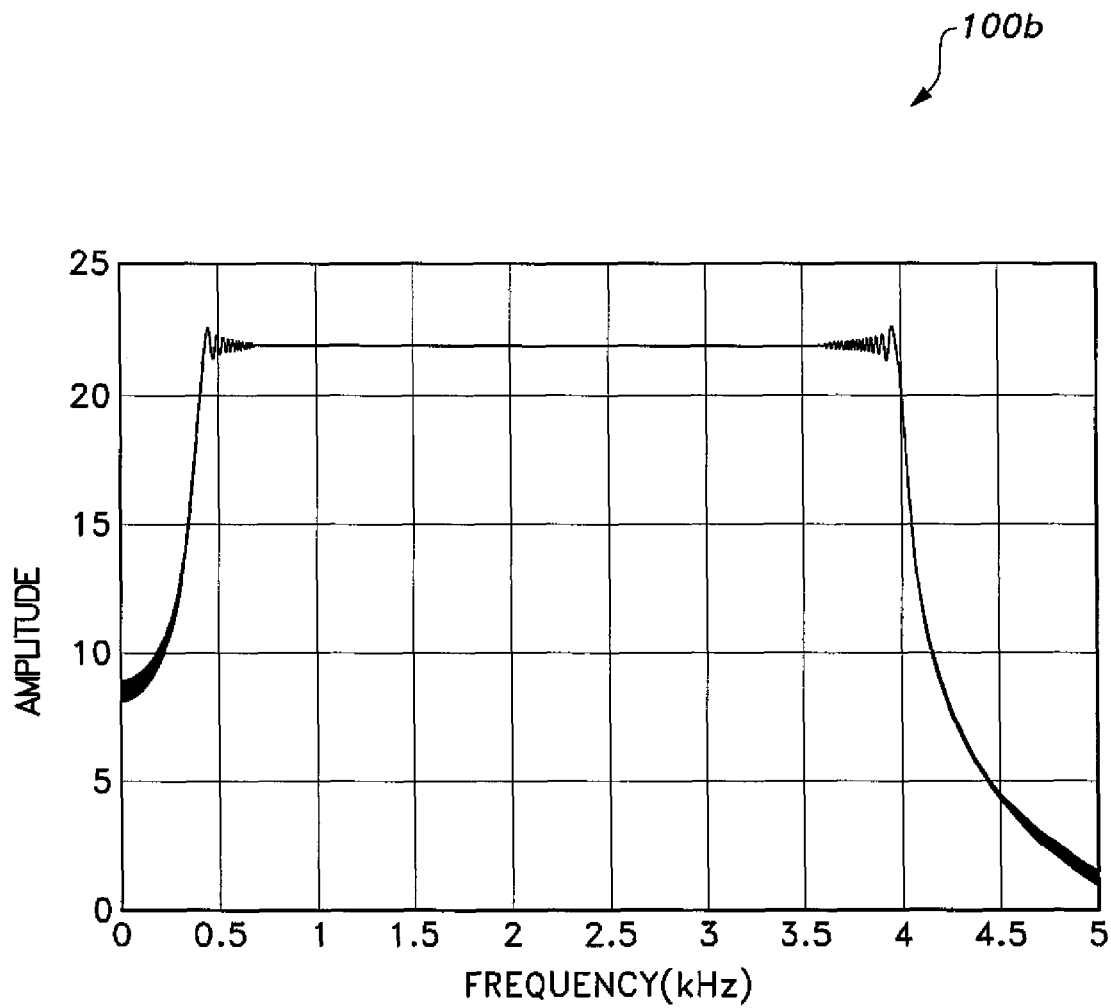
FIG. 1B is a plot showing the frequency domain spectrum of the exemplary cognitive radio sensing chirp signal of FIG. 1 with processing gain selected to provide a rectangular spectrum.

The cognitive radio sensing method employs wideband chirp signal frequency modulation for a digital signal, which is used in sensing the operable spectrum of the cognitive radio. The chirp signal is inherently wideband, as its bandwidth spread over a range of frequencies exceeds the signaling frequency of the cognitive radio. The chirp signal is generated by linear frequency modulation of a digital signal. Thus, the instantaneous frequency of the chirp signal increases or decreases linearly with time. As shown in FIG. 1A, the bandwidth of a chirp signal 100a extends from the starting frequency sweep f1 to the final frequency sweep f2. With a proper choice for processing gain, i.e., the FT product, where T is the bit period, is such that the spectrum of the chirp signal has a distinctive, nearly square shape 100b, as shown in FIG. 1B.

Figure 2:
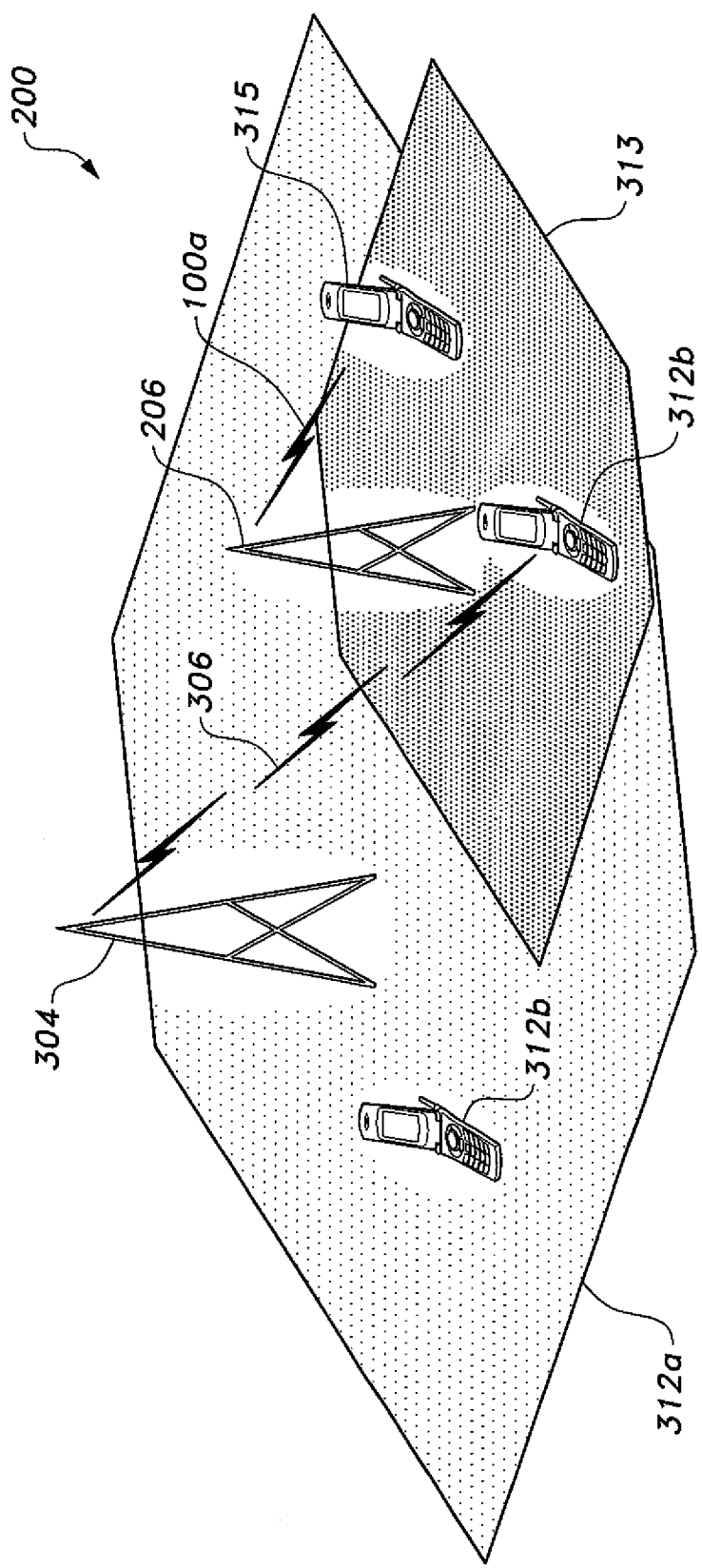
FIG. 2 is a block diagram showing a system architecture utilizing a cognitive radio sensing method according to the present invention.

As shown in FIG. 2, the system architecture is a hybrid network 200, comprising a primary radio network 312a and a cognitive "adaptive" radio network 313. The two networks 312a and 313 coexist, i.e., have overlapping service areas, without being physically connected.

The primary radio network 312a comprises a primary base station 304 serving primary "licensed" users 312b over the primary coverage area. The primary base station 304 performs normal functions of a base station.

The cognitive radio network 313 of the cognitive radio sensing system is adaptive and comprises a cognitive radio base station 206, which serves cognitive radio user devices 315. The coverage area of cognitive radio network 313 overlaps with the coverage area of the primary network 312a, which serves primary network user devices 312b. The idea of cognitive radio transmission strategy is to sense the radio spectrum, looking for available carrier frequencies to be used for an opportunistic transmission. The idea is to avoid using a frequency being instantly (instantaneously, at that precise moment) used by another radio. Thus, the sensing spectrum is the range of frequencies that a cognitive radio monitors in order to assess its radio resources for opportunistic transmission. In order to accomplish this, the cognitive radio user devices 315 have a transmission algorithm that allows devices 315 to transmit only after the devices 315 sense the availability of the required radio resources, i.e., if the cognitive radio user devices 315 detect that a particular channel is in use, the cognitive radio user device 315 automatically switches to an unused channel before transmitting. The transmission algorithm makes sure that no excessive interference from cognitive radio user devices 315 occurs at the primary user devices 312b.

Figure 3:
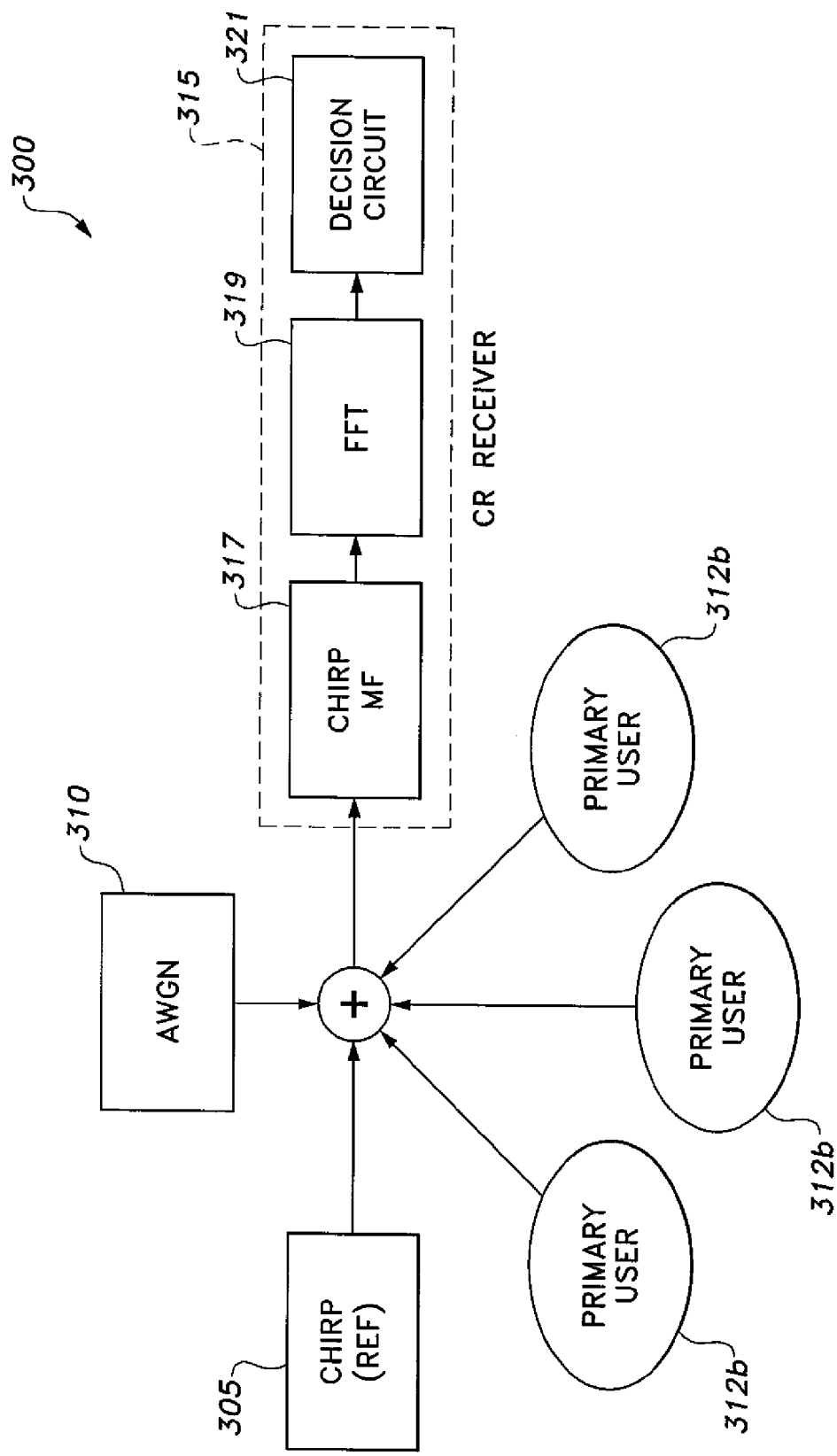
FIG. 3 is a block diagram showing the frequency sensing process of a cognitive radio sensing method according to the present invention.

FIG. 3 shows a block diagram of the cognitive radio sensing system 300, which is simulated using Matlab™. The simulation of the cognitive radio system 300 includes the step of the cognitive radio base station 206 broadcasting a low power reference chirp signal 100a using a chirp generator 305. The reference chirp signal 100a is preferably a low power signal in order to avoid causing excessive interference to other transmissions in the vicinity sharing the spectrum. The parameters (linear chirp rate, bandwidth, etc.) of the reference linear chirp signal are previously agreed upon between the base station and the cognitive radio receiving stations, or are previously communicated by the base station to the cognitive radio receiving stations, or are predetermined by the protocol of the cognitive radio system so that the receiving stations can generate a local copy of the reference chirp signal and be equipped with matching filters for the reference chirp signal. Along with transmissions from primary user devices 312b and electromagnetic additive white Gaussian noise (AWGN 310), the reference chirp signal 100a is received by the CR user device 315, which employs a chirp signal matched filter 317 in the cognitive radio receiver having an impulse response that produces a replica (or conjugate) of the reference chirp signal 100a. An exemplary CR user device 315 may be a cellular telephone, smart phone, or other radiotelephone transceiver.

Figure 7A:
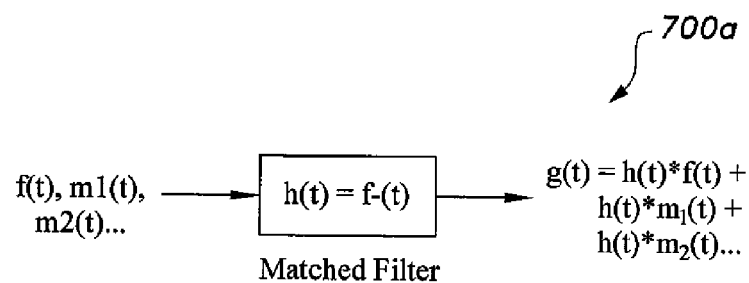
FIG. 7A is a block diagram showing the system function of the matched filter in the time domain in a cognitive radio sensing method according to the present invention.
Figure 7B:
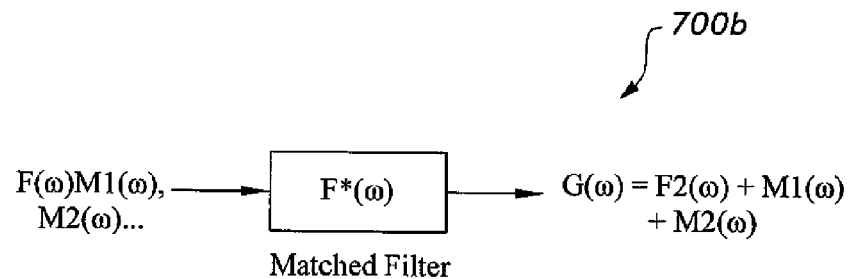
FIG. 7B is a block diagram showing the system function of the matched filter in the frequency domain in a cognitive radio sensing method according to the present invention.

With respect to frequency sensing, spectral resolution is obtained by cross-correlating the chirp signal with a locally generated copy of itself, (i.e., auto-correlation). This auto-correlation is achieved using a chirp matched filter 317. The result of this is optimal reception of the chirp signal where excessive noise components are removed. FIG. 7A shows a block diagram of the matched filter's system transfer function 700a expressed in the time domain. The inputs to the chirp signal matched filter is the reference chirp signal f(t), and the interfering carrier signals (tones) of primary users m1($t$), m2($t$), etc. For simplicity, the problem can be addressed in the frequency domain because time convolution is transferred into frequency multiplication, as shown in FIG. 7B. Therefore:

$$G(\omega)=F^2(\omega)+F(\omega)M1(\omega)+F(\omega)M2(\omega) \quad (1)$$

Thus, the spectral resolution sought for spectral sensing is obtained by match filtering the received reference chirp. By definition, match filtering includes the process of correlating the signal with a locally generated version of itself. The procedure, as mentioned above, is known as autocorrelation because this procedure correlates the signal with itself. In the frequency domain, the correlation is achieved by multiplying the spectral of the signal with the spectral of its mathematical conjugate.

To obtain spectral resolution, the output of the chirp matched filter should be transferred to the frequency domain. Thus, the auto-correlation signal is fed to a Fast Fourier Transform (FFT) 319. What we mean by resolution is having a flat top that enable us to better set a threshold to perform the sensing function. The good thing about a chirp signal matched-filter is that it first optimally removes noise from a received signal and provides this interesting resolution. Since the frequency representation of a sine wave is the unit impulse function in the frequency domain shifted to its corresponding frequency, equation (1) can be further simplified as:

$$G(\omega)=F^2(\omega)+M1(\omega)+M2(\omega). \quad (2)$$

Figure 7C:
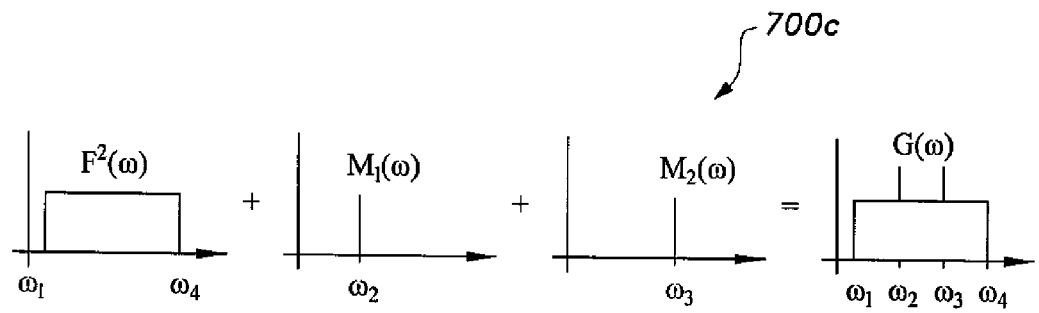
FIG. 7C are plots showing graphical representations of the frequencies of the chirp signal, the interference, and the chirp signal's complex conjugate being processed by the matched filter to provide the matched filter output G (ω) in a cognitive radio sensing method according to the present invention.

As shown graphically in the plots 700c of FIG. 7C, the output of the matched filter has the spectrum G(ω) where the frequency domain spectrum of the chirp signal is a square wave function and M1 and M2 appear as spikes above the square wave chirp signal. The threshold value should be set just above the flat top of the received waveform.

The output of the FFT algorithm 319 is fed into a decision circuit 321, which is set at the aforementioned threshold value to decide whether the signal of a primary user device 312b interferes with the reference chirp signal 100a. The decision circuit 321 implements an algorithm to detect the peaks representing primary users' frequencies. This algorithm belongs to the search algorithms family and could be implemented either using sequential or binary search. Either algorithm should return the frequency values at which the FFT magnitude values exceed the threshold.

Figure 4:
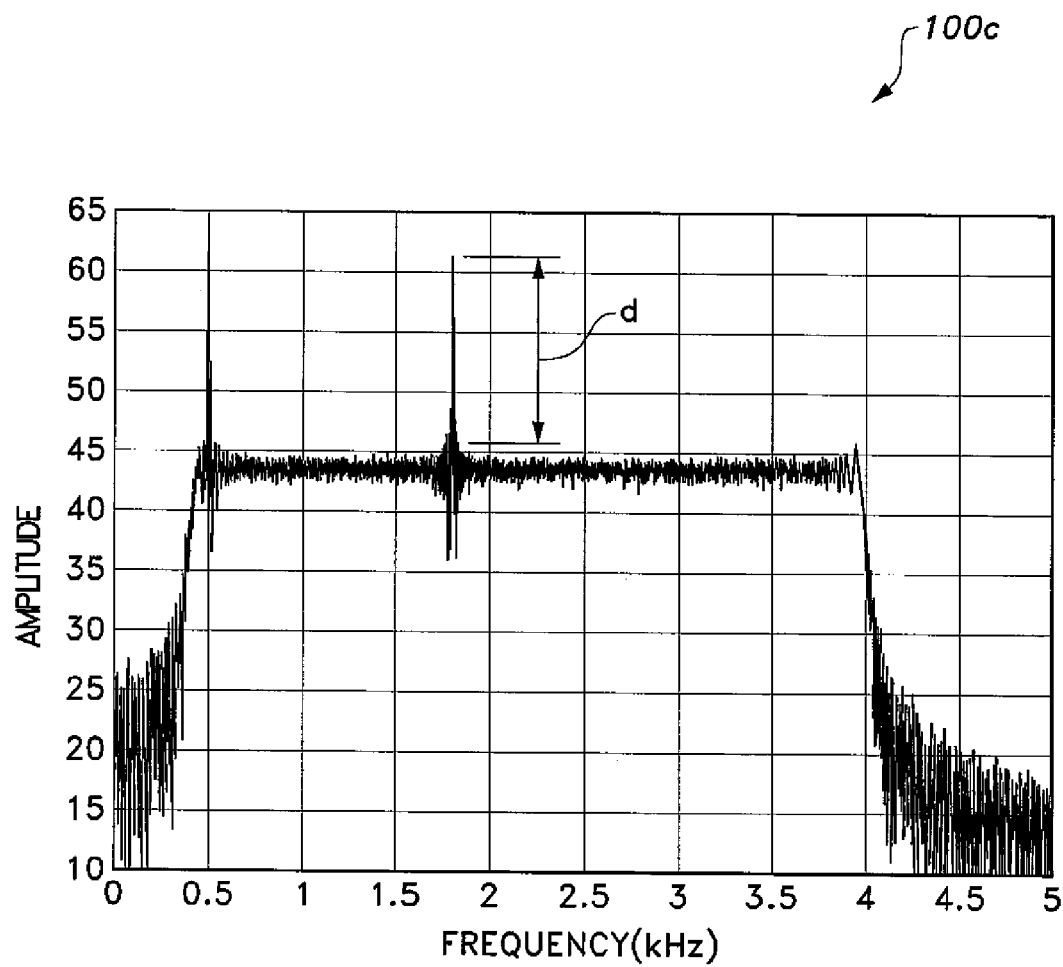
FIG. 4 is an exemplary frequency domain spectrum of an exemplary received signal after match filtering and Fast Fourier Transform in a cognitive radio sensing system according to the present invention.

As shown in FIG. 4, interfering frequencies (signals from primary user devices 312b) appear as spikes, i.e., peaks, rising above the flat-top 100c of the received chirp reference 100a spectrum in the presence of AWGN, simulated by an AWGN generator 310. The Signal to Interference plus Noise Ratio (SINR) for an interfering (primary user) signal is 20 dB.

Figure 5:
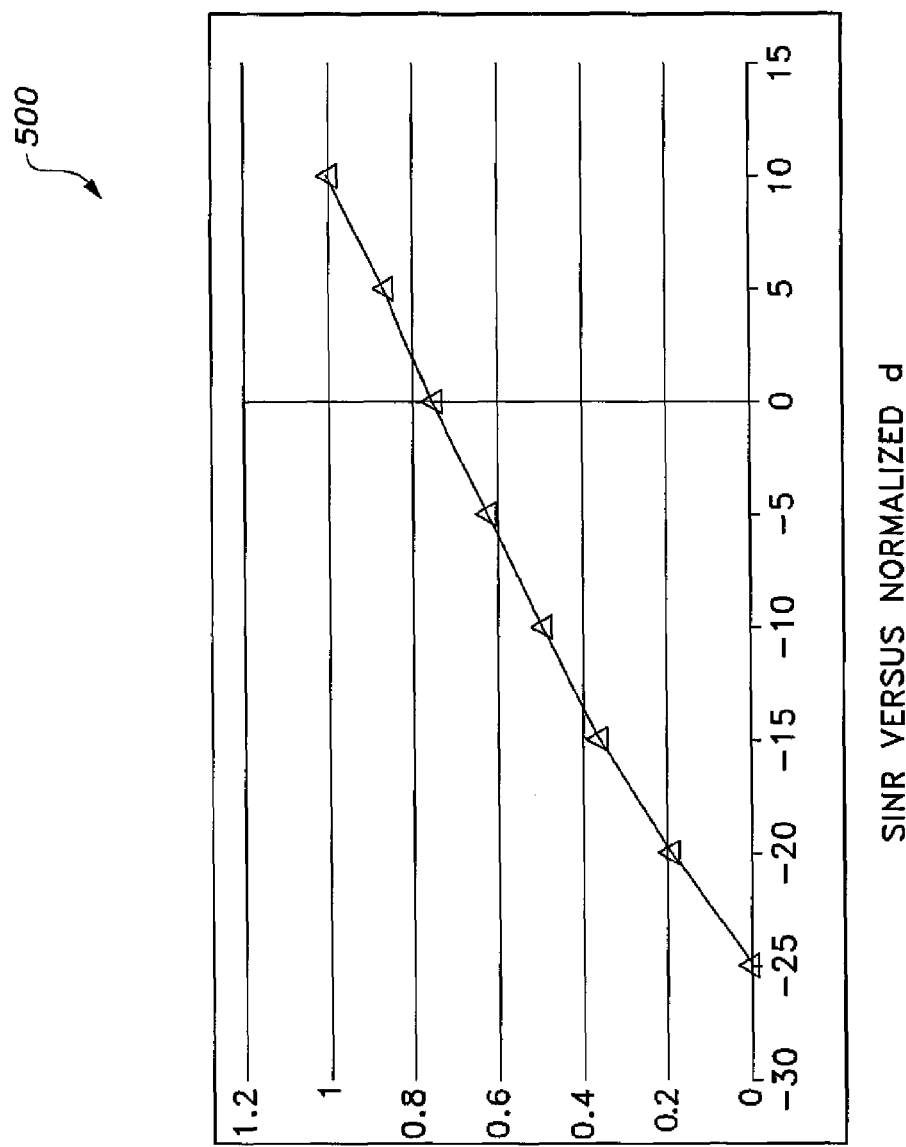
FIG. 5 is a plot showing SINR versus normalized d.

As shown in FIG. 5, plot 500 displays the carrier's SINR versus d, normalized to a value of d at SINR=10 dB, which measures the distance between the peak of the carrier's spike and the threshold value set just above the noisy flat top of the FFT algorithm 319 output. The value of d=0 dB signifies that the spike is no longer distinguishable from the noise, and therefore the probability of a false alarm is great. Preferably, the noise floor determines the threshold value for the decision circuit 315, since d decreases as SINR decreases. For the MATLAB™ simulation, it is shown that d=0 at SINR=−25 dB, which is an extremely low SINR value. The SINR values were calculated assuming that transmissions of primary user devices 312b are in synchronization with the referenced chirp signal 100a.

Figure 6:
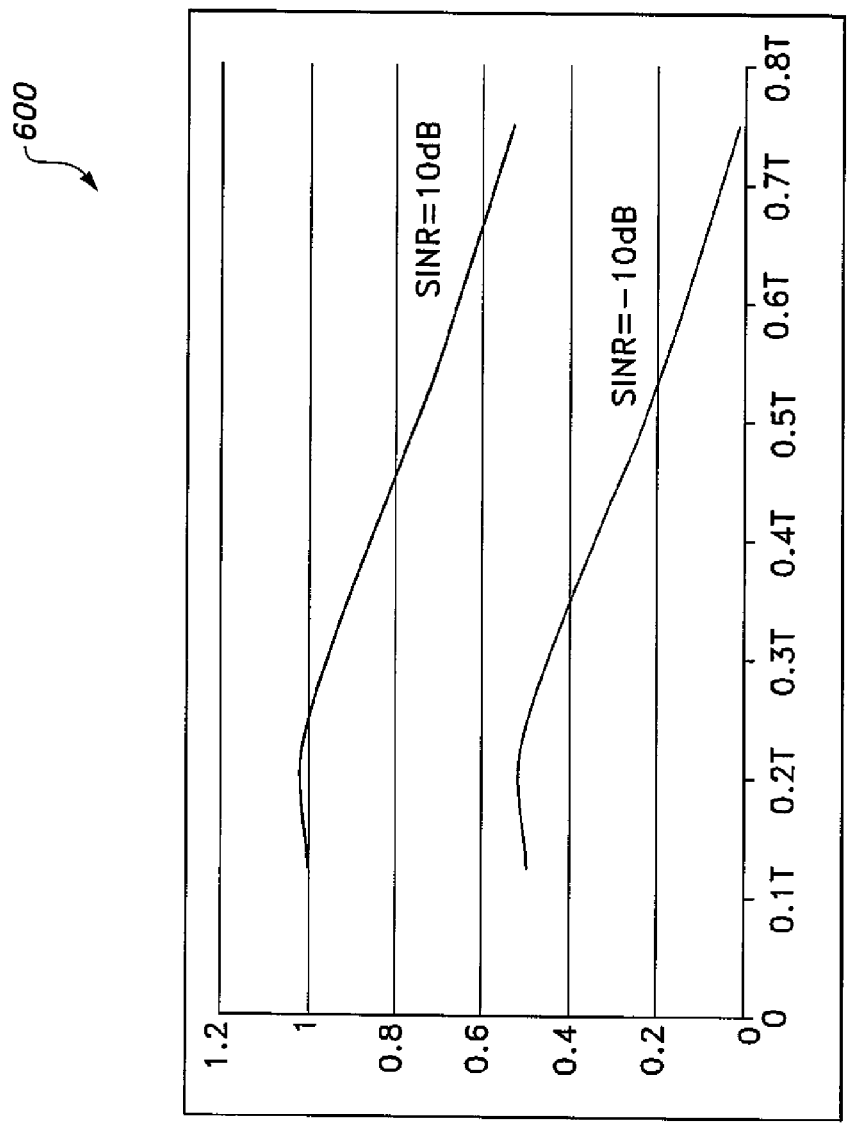
FIG. 6 is a plot showing delay versus normalized d.

Plot 600 of FIG. 6 shows Delay versus normalized d, which investigates the effect assuming both networks (primary 312a and cognitive 313) are synchronized. The plot 600 shows how d changes with respect to the delay between primary user's signal and the reference chirp signal. For example, if the primary user's signal is delayed by 0.5T seconds, where T is the bit period, d drops by 25%. Nonetheless, the system is tolerant to delay up to 0.25T seconds in both SINR cases shown. Moreover, additional research has shown that in the event when the primary and cognitive networks are not synchronized, d is dependent on the overlapping duration between the chirp duration (Tc) and the bit duration (Tb). Therefore, even in worst case scenarios when the overlapping between the first chirp duration and the carrier bit is not enough, the consecutive overlapping should be enough to make a better decision. This may lead to the conclusion that the observation interval must be at least twice as much as the chirp signal period to avoid this drawback.

Figure 8:
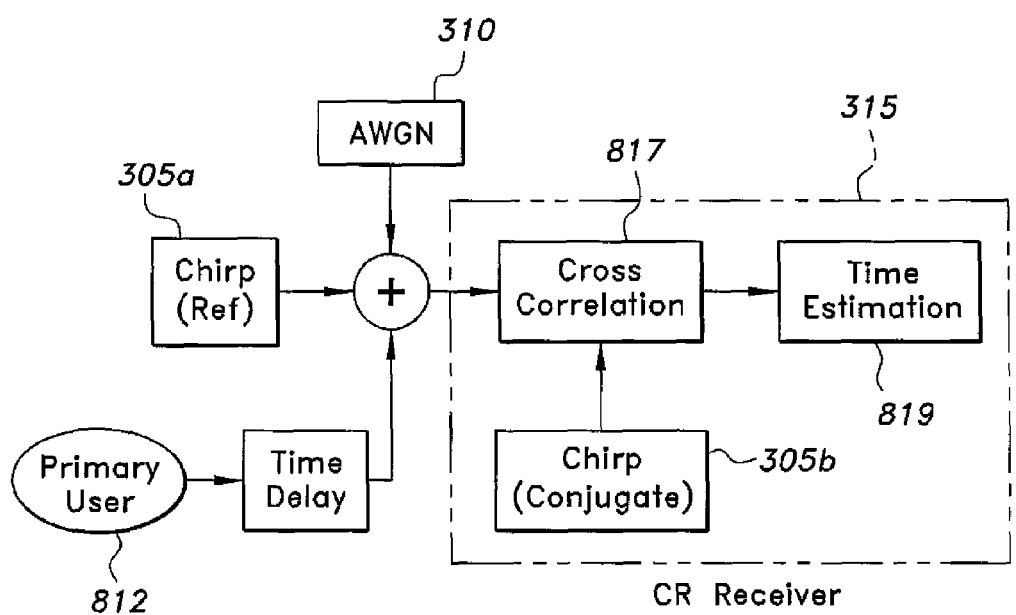
FIG. 8 is a block diagram showing the temporal sensing process of a cognitive radio sensing method according to the present invention.

With respect to temporal resolution, this resolution is obtained by the process of correlation. But in this case the received chirp is correlated (in the time domain) with its mathematical conjugate. This procedure is distinguished from the spectral sensing in that the correlation is with the conjugate, not the signal itself. Moreover, this is called cross-correlation, not autocorrelation. Actually, when the signal is correlated with any other signal apart from itself, this is called cross-correlation. As shown in FIG. 8, the reference chirp 305a, primary user 812, and noise 310 are additively received into the cognitive receiver 315. Within the cognitive receiver 315, a cross-correlator 817 cross-correlates the received signal with the locally generated conjugate 305b of the reference chirp 305a.

Primary user interference times are discerned by feeding the output of the cross-correlator 817 to a time estimator 315, which estimates the interference time via, e.g., a timer that starts counting the tone delay referenced to the starting time of the chirp signal reception. The timer is re-set as soon as the flat top of received chirp signal has begun to deform. The deformation corresponds to the moment a primary user starts to transmit. To sense this moment, received samples must be compared against a threshold value. The threshold value should be set just above the flat top of the received waveform.

Figure 9A:
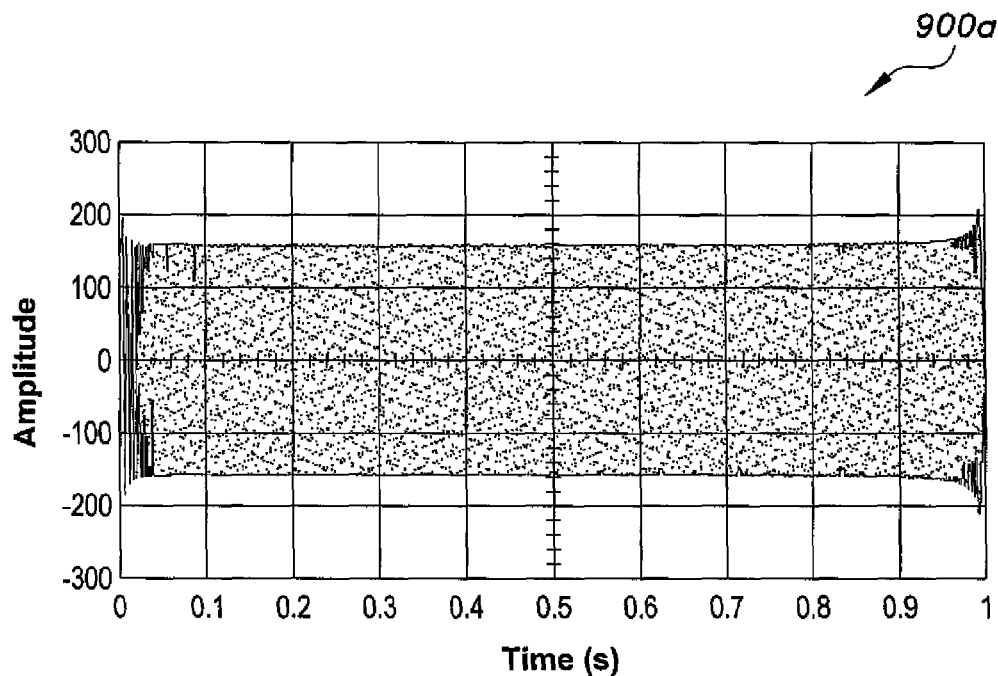
FIG. 9A is a plot showing amplitude vs. time for a wideband chirp with no interference.
Figure 9B:
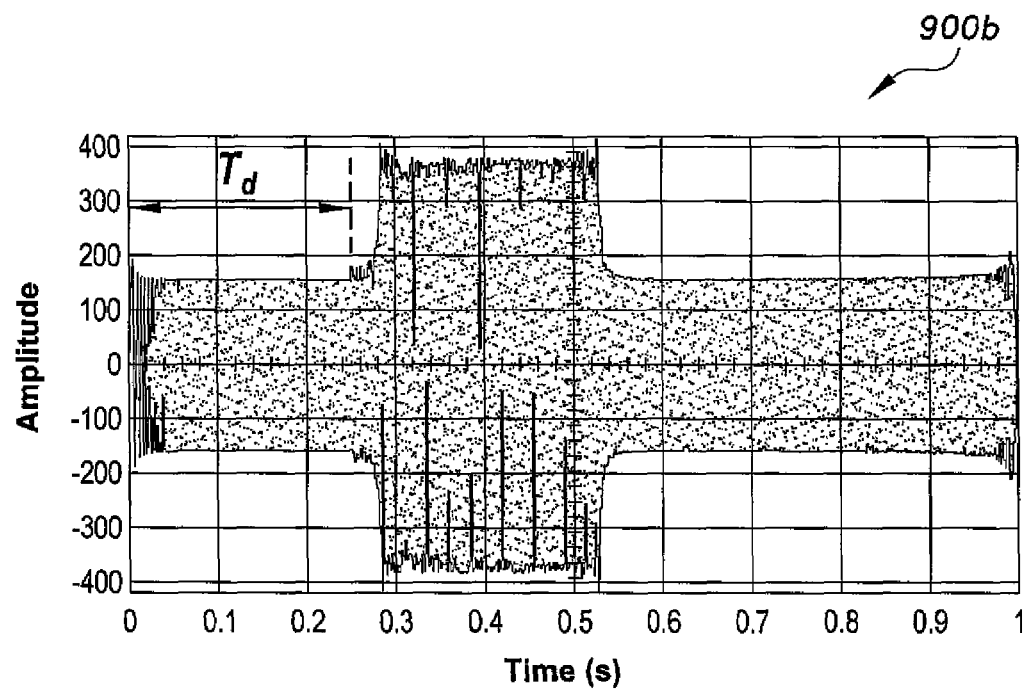
FIG. 9B is a plot showing amplitude vs. time for the wideband chirp signal of FIG. 9A in the presence of primary user interference.
Figure 10:
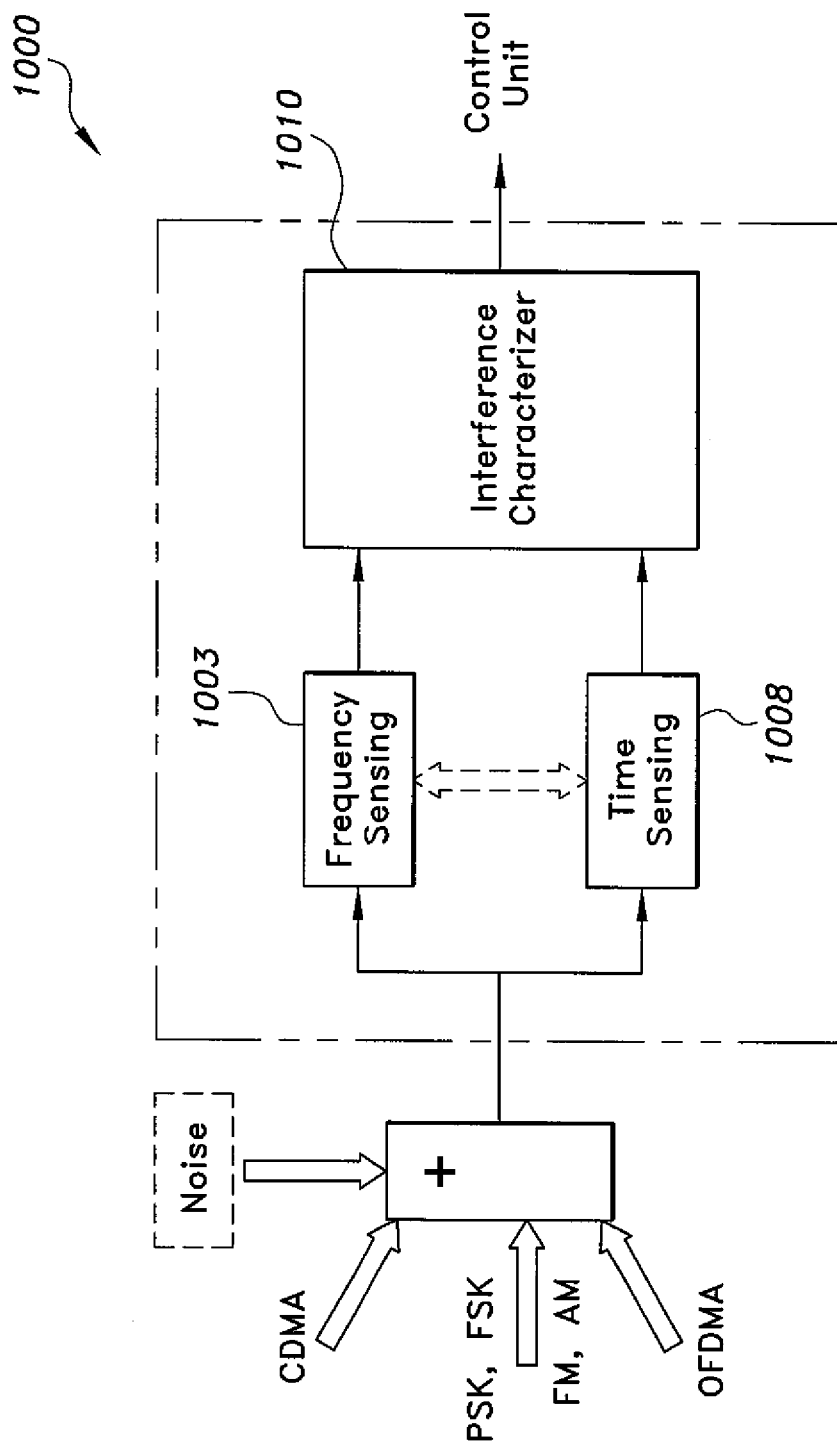
FIG. 10 is a block diagram showing a cognitive radio system using both frequency and temporal sensing in a cognitive radio sensing method according to the present invention.

The output of the temporal sensing cross-correlation process is shown in FIGS. 9A and 9B, where plot 900a shows a flat top with no interfering primary users and plot 900b shows a flat top, except during the time a primary user is transmitting. It should be understood that this signal is in the time domain in order to facilitate temporal sensing. FIG. 10 shows a CR system 1000 utilizing both frequency sensing 1003 and time sensing 1008 to assist an interference characterizer 1010, which controls the cognitive radio.

It should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the method. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

It is to be understood that the present invention is not limited to the embodiments described above, but encompasses any and all embodiments within the scope of the following claims.

I claim:

1. In a cognitive radio system having a cognitive radio base station and a plurality of cognitive radio users operating in a cognitive radio coverage area overlapping a primary users' radio system coverage area, wherein the cognitive radio base station generates a low power wideband linear reference chirp signal extending over all channels and frequencies within the cognitive radio spectrum in the cognitive radio coverage area according to predetermined reference chirp signal parameters, a cognitive radio sensing method comprising the steps of:
  (a) receiving a signal in the cognitive radio spectrum in the cognitive radio coverage area at a cognitive radio user's receiver on a cognitive radio channel;
  (b) generating a local copy of the linear reference chirp signal in the cognitive radio user's receiver according to the predetermined reference chirp signal parameters;
  (c) correlating the received signal with the local copy of the linear reference chirp signal in a matched filter in the cognitive radio user's receiver, the matched filter producing a correlated chirp signal output;
  (d) transforming the correlated chirp signal output from a time domain representation into a frequency domain representation of the correlated chirp signal output;
  (e) detecting interfering signals from primary users with a processor programmed with a predetermined spectral threshold level above a flat top of the frequency domain representation of the transformed correlated chirp signal output, the threshold level being slightly above noise level in the channel;

(f) increasing said predetermined spectral threshold level from a normalized value of approximately 0.2 to a normalized value of approximately 0.8 when a signal to interference plus noise ratio increases from a value of approximately −20 dB to a value of approximately 0 dB;

(g) increasing said predetermined spectral threshold level from a normalized value of approximately 0.8 to a normalized value of approximately 1.0 when said signal to interference plus noise ratio increases from a value of approximately 0 dB to a value of approximately 10 dB; and (h) automatically changing frequencies at the cognitive user's receiver before transmitting when the processor detects frequency spikes above the threshold in the transformed correlated chirp signal output in order to avoid interference with primary users' signals.

2. The cognitive radio sensing method according to claim 1, wherein said transforming step further comprises the step of performing said transform over a minimum interval of approximately 2*T, where T is a period of said chirp reference signal.

3. The cognitive radio sensing method according to claim 1, wherein said transforming step comprises performing a Fast Fourier Transform of said correlated chirp signal output.

4. In a cognitive radio system having a cognitive radio base station and a plurality of cognitive radio users operating in a cognitive radio coverage area overlapping a primary users' radio system coverage area, wherein the cognitive radio base station generates a low power wideband linear reference chirp signal extending over all channels and frequencies within the cognitive radio spectrum in the cognitive radio coverage area according to predetermined reference chirp signal parameters, a cognitive radio sensing method comprising the steps of:

(a) receiving a signal in the cognitive radio spectrum in the cognitive radio coverage area at a cognitive radio user's receiver on a cognitive radio channel;

(b) generating a local copy of a conjugate of the linear reference chirp signal in the cognitive radio user's receiver according to the predetermined reference chirp signal parameters;

(c) cross-correlating the received signal with the local copy of the conjugate of the linear reference chirp signal in a matched filter in the cognitive radio user's receiver, the matched filter producing a cross-correlated chirp signal output;

(d) estimating times of interference and noise from the primary users with a processor programmed to detect times at which the chirp cross-correlation output exceeds a predetermined envelope threshold level above an envelope of the cross-correlated chirp signal output;

(e) transforming the cross-correlated chirp signal output from a time domain representation into a frequency domain representation;

(f) determining frequencies of interference and noise from the primary users with the processor by detecting spectral components of the frequency domain representation of the cross-correlated chirp signal output exceeding the predetermined spectral threshold level above a flat top of the frequency domain representation of the cross-correlated chirp signal output;

(g) increasing said predetermined spectral threshold level from a normalized value of approximately 0.2 to a normalized value of approximately 0.8 when a signal to interference plus noise ratio increases from a value of approximately −20 dB to a value of approximately 0 dB;

(h) increasing said predetermined spectral threshold level from a normalized value of approximately 0.8 to a normalized value of approximately 1.0 when said signal to interference plus noise ratio increases from a value of approximately 0 dB to a value of approximately 10 dB; and (i) timing transmission and reception of the cognitive radio user's radio to avoid the interference frequencies determined in step (f) at the interference times determined in step (d).

5. The cognitive radio sensing method according to claim 4, wherein said transforming step further comprises the step of performing said transform over a minimum interval of approximately 2*T, where T is a period of said chirp reference signal.

6. The cognitive radio sensing method according to claim 4, wherein said determining frequencies step further comprises the steps of:

sweeping across a plurality of magnitude values resulting from said transforming step; and sequentially comparing the magnitude values to said predetermined spectral threshold level, thereby determining existence of an interfering tone.

7. The cognitive radio sensing method according to claim 4, wherein said estimating times step further comprises processing the cross-correlated chirp signal output in a delay circuit having a timer configured to count an interfering tone delay referenced to a starting time of reception of said low power reference chirp signal.

8. A computer software product, comprising a non-transitory medium readable by a processor, the medium having stored thereon a set of instructions for performing a cognitive radio sensing method, the set of instructions including:

(a) a first sequence of instructions which, when executed by the processor, causes said processor to receive a low power reference chirp signal broadcast by a cognitive radio base station, the chirp signal being received in the presence of noise and interference from primary users of a predetermined multi-channel spectrum overlapping a spectrum of a cognitive radio system, the low power reference chirp signal having a bandwidth covering the entire spectrum of the cognitive radio system;

(b) a second sequence of instructions which, when executed by the processor, causes said processor to correlate the chirp signal in the presence of noise and said interference from said primary users with a locally stored copy of the chirp signal, said correlating step providing a chirp correlation output;

(c) a third sequence of instructions which, when executed by the processor, causes said processor to transform said chirp correlation output into a frequency domain;

(d) a fourth sequence of instructions which, when executed by the processor, causes said processor to determine frequencies of interference and noise from said primary users by observing spectral components of said frequency domain transformed chirp correlation output which exceed a predetermined spectral threshold level above an expected flat top of said frequency domain transformed chirp correlation output;

(e) a fifth sequence of instructions which, when executed by the processor, causes said processor to tune said cognitive radio to transmission and reception frequencies that spectrally avoid the interference frequencies determined in step (d);

(f) a sixth sequence of instructions which, when executed by the processor, causes said processor to increase said predetermined spectral threshold level from a normalized value of approximately 0.2 to a normalized value of approximately 0.8 when a signal to interference plus noise ratio increases from a value of approximately −20 dB to a value of approximately 0 dB; and (g) a seventh sequence of instructions which, when executed by the processor, causes said processor to increase said predetermined spectral threshold level from a normalized value of approximately 0.8 to a normalized value of approximately 1.0 when said signal to interference plus noise ratio increases from a value of approximately 0 dB to a value of approximately 10 dB.

9. The computer software product according to claim 8, further comprising an eighth sequence of instructions when executed by the processor, causes said processor to perform said frequency domain transform over a minimum interval of approximately 2*T, where T is a period of said chirp reference signal.

10. The computer software product according to claim 8, further comprising:
    a ninth sequence of instructions when executed by the processor, causes said processor to sweep across a plurality of magnitude values resulting from said frequency domain transform step; and
    a tenth sequence of instructions when executed by the processor, causes said processor to sequentially compare said magnitude values to said predetermined spectral threshold level, to thereby determine existence of an interfering tone.

11. The computer software product according to claim 8, further comprising:
    an eleventh sequence of instructions when executed by the processor, causes said processor to cross-correlate the chirp signal in the presence of noise and interference with a locally stored copy of the conjugate of said chirp signal, said cross-correlating step providing a chirp cross-correlation output;
    a twelfth sequence of instructions when executed by the processor, causes said processor to estimate times of interference and noise from said primary users by observing times at which said chirp cross-correlation output exceeds a predetermined envelope threshold level above an expected envelope of said chirp cross-correlation output; and
    a thirteenth sequence of instructions when executed by the processor, causes said processor to time transmission and reception of said cognitive radio to avoid said interference frequencies determined by said fourth sequence of instructions at the interference times determined by said twelfth sequence of instructions.

12. The computer software product according to claim 11, further comprising a fourteenth sequence of instructions when executed by the processor, causes said processor to during said time estimation use a timer to count an interfering tone delay referenced to a starting time of reception of said low power reference chirp signal.

\* \* \* \* \*